United States Patent
Caronni et al.

(10) Patent No.: US 7,613,774 B1
(45) Date of Patent: Nov. 3, 2009

(54) CHAPERONES IN A DISTRIBUTED SYSTEM

(75) Inventors: Germano Caronni, Menlo Park, CA (US); Raphael J. Rom, Palo Alto, CA (US); Glenn Carter Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 802 days.

(21) Appl. No.: 11/069,804

(22) Filed: Mar. 1, 2005

(51) Int. Cl.
 *G06F 15/16* (2006.01)
 *G06F 15/173* (2006.01)
(52) U.S. Cl. .................. 709/205; 709/224; 726/17
(58) Field of Classification Search ........... 709/205, 709/224; 726/17
See application file for complete search history.

(56) References Cited

U.S. PATENT DOCUMENTS

| | | | | |
|---|---|---|---|---|
| 5,996,075 | A * | 11/1999 | Matena | 726/10 |
| 6,205,510 | B1 * | 3/2001 | Mendel | 711/1 |
| 6,311,217 | B1 * | 10/2001 | Ehlinger et al. | 709/226 |
| 7,296,298 | B2 * | 11/2007 | Salgado | 726/30 |
| 2004/0085329 | A1 * | 5/2004 | Xu et al. | 345/629 |
| 2004/0085912 | A1 * | 5/2004 | Xu et al. | 370/254 |
| 2004/0165536 | A1 * | 8/2004 | Xu et al. | 370/252 |
| 2006/0021023 | A1 * | 1/2006 | Stewart et al. | 726/17 |
| 2006/0191020 | A1 * | 8/2006 | Miller | 726/28 |
| 2007/0192321 | A1 * | 8/2007 | Farr et al. | 707/9 |

OTHER PUBLICATIONS

A. Adya, et al.; "Farsite: Federated, Available, and Reliable Storage for an Incompletely Trusted Environment"; Proceedings of the $5^{th}$ Symposium on Operating Systems and Design Implementation OSDI; Dec. 2002 (14 pages).
I. Clarke, et al.; "Freenet: A Distributed Anonymous Information Storage and Retrieval System"; Lecture Notes in Computer Science; 2000 (21 pages).
J. Kubiatowicz, et al.; "OceanStore: An Architecture for Global-Scale Persistent Storage"; Proceedings of ACM ASPLOS; Nov. 2000 (12 pages).
A. Rowstron, et al.; "Storage Management and Caching in PAST, a Large-Scale, Peristent Peer-to-Peer Storage Utility"; Symposium on Operating Systems Principles; Oct. 2001 (13 pages).

(Continued)

Primary Examiner—Aaron Strange
(74) Attorney, Agent, or Firm—Osha • Liang LLP

(57) ABSTRACT

A method for approving a response or a decision of an observed node in a distributed system that includes generating at least one selected from the group consisting of the response and the decision by the observed node, forwarding the at least one selected from the group consisting of the response and the decision to at least one of the plurality of chaperones associated with the observed node based on a chaperone scheme, and approving the least one selected from the group consisting of the response and the decision by the plurality of chaperones using a chaperone voting policy and a chaperone approval policy to obtain at least one selected from the group consisting of a approved response and a approved decision, wherein the distributed system implements an overlay network for message delivery, and wherein the observed node and the plurality of chaperones communicate using the overlay network.

22 Claims, 4 Drawing Sheets

OTHER PUBLICATIONS

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the 5th USENIX Symposium on Operating Systems Design and Implementation (OSDI '02); Dec. 2002 (23 pages).

F. Dabek, et al.; "Towards a Common API for Structured Peer-to-Peer Overlays"; Proceedings of 2nd International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures, Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. 30th Annual ACM Symposium on Theory of Computing (STOC); May 1998 (10 pages).

* cited by examiner

US 7,613,774 B1

CHAPERONES IN A DISTRIBUTED SYSTEM

BACKGROUND

A distributed system typically includes a number of interconnected nodes. The nodes typically include a processor and memory. In addition, the nodes also include the necessary hardware and software to communicate with other nodes in the distributed system. The interconnected nodes may also communicate with each other using an overlay network. Nodes belonging to the overlay network route messages between each other using the underlying networking infrastructure (e.g., Internet Protocol (IP) and Transmission Control Protocol (TCP), etc.). While the underlying network infrastructure has the information and capability to directly route messages between specific computers, overlay networks typically maintain only partial routing information and rely on successive forwarding through intermediate nodes in order to deliver a message to its final intended destination.

One common use for overlay networks is to build distributed hash tables (DHT). In one implementation, each node in the overlay network is associated with a Globally Unique Identifier (GUID) and stores a part of the DHT. When a node (i.e., the requesting node) requires a piece of data stored on a node (i.e., a target node) in the overlay network, the requesting node determines the GUID associated with target node, which contains the requested data. The requesting node then queries its routing table entries (i.e., the DHT entries) to find the node (i.e., an intermediate node) with the GUID closest to the target node's GUID. The request is then forwarded to the intermediate node. The intermediate node follows the same process, comparing the target node's GUID with the intermediate node's routing table entries. The aforementioned process is repeated until the target node is reached. Typically, the overlay network maintains enough information in the DHT to determine the appropriate intermediate node.

To store data in the aforementioned overlay network, the data is loaded onto a particular node (i.e., a target node) in the overlay network and is associated with a GUID. The node that stores the data subsequently publishes the presence of the GUID on the node. Another node (i.e., the root node) in the network stores the necessary information in its DHT to indicate that the data associated with the GUID is stored in the target node. It is important to note that any given node in the overlay network may operate as both a target node (i.e., stores data) and as a root node (i.e., maintains a DHT). Typically, a given root node is only responsible for a certain range of GUIDs.

SUMMARY

In general, in one aspect, the invention relates to a method for approving a response or a decision of an observed node in a distributed system, comprising generating at least one selected from the group consisting of the response and the decision by the observed node, forwarding the at least one selected from the group consisting of the response and the decision to at least one of the plurality of chaperones associated with the observed node based on a chaperone scheme, and approving the least one selected from the group consisting of the response and the decision by the plurality of chaperones using a chaperone voting policy and a chaperone approval policy to obtain at least one selected from the group consisting of a approved response and a approved decision, wherein the distributed system implements an overlay network for message delivery, and wherein the observed node and the plurality of chaperones communicate using the overlay network.

In general, in one aspect, the invention relates to a distributed system, comprising an observed node, and a plurality of chaperone nodes, wherein the plurality of chaperone nodes are configured to perform at least one selected from the group consisting of providing a signed response to observed node in response to a request from the observed node, approving a response provided by the observed node, and approving a decision made by the observed node, wherein the distributed system implements an overlay network for message delivery, and wherein the observed node and the plurality of chaperones communicate using the overlay network.

In general, in one aspect, the invention relates to a computer readable medium comprising software instructions for approving a response or a decision of an observed node in a distributed system, comprising software instructions to generate at least one selected from the group consisting of the response and the decision by the observed node, forward the at least one selected from the group consisting of the response and the decision to at least one of the plurality of chaperones associated with the observed node based on a chaperone scheme, and approve the least one selected from the group consisting of the response and the decision by the plurality of chaperones using a chaperone voting policy and a chaperone approval policy to obtain at least one selected from the group consisting of a approved response and a approved decision, wherein the distributed system implements an overlay network for message delivery, and wherein the observed node and the plurality of chaperones communicate using the overlay network.

Other aspects of the invention will be apparent from the following description and the appended claims.

DETAILED DESCRIPTION

Figure 1:
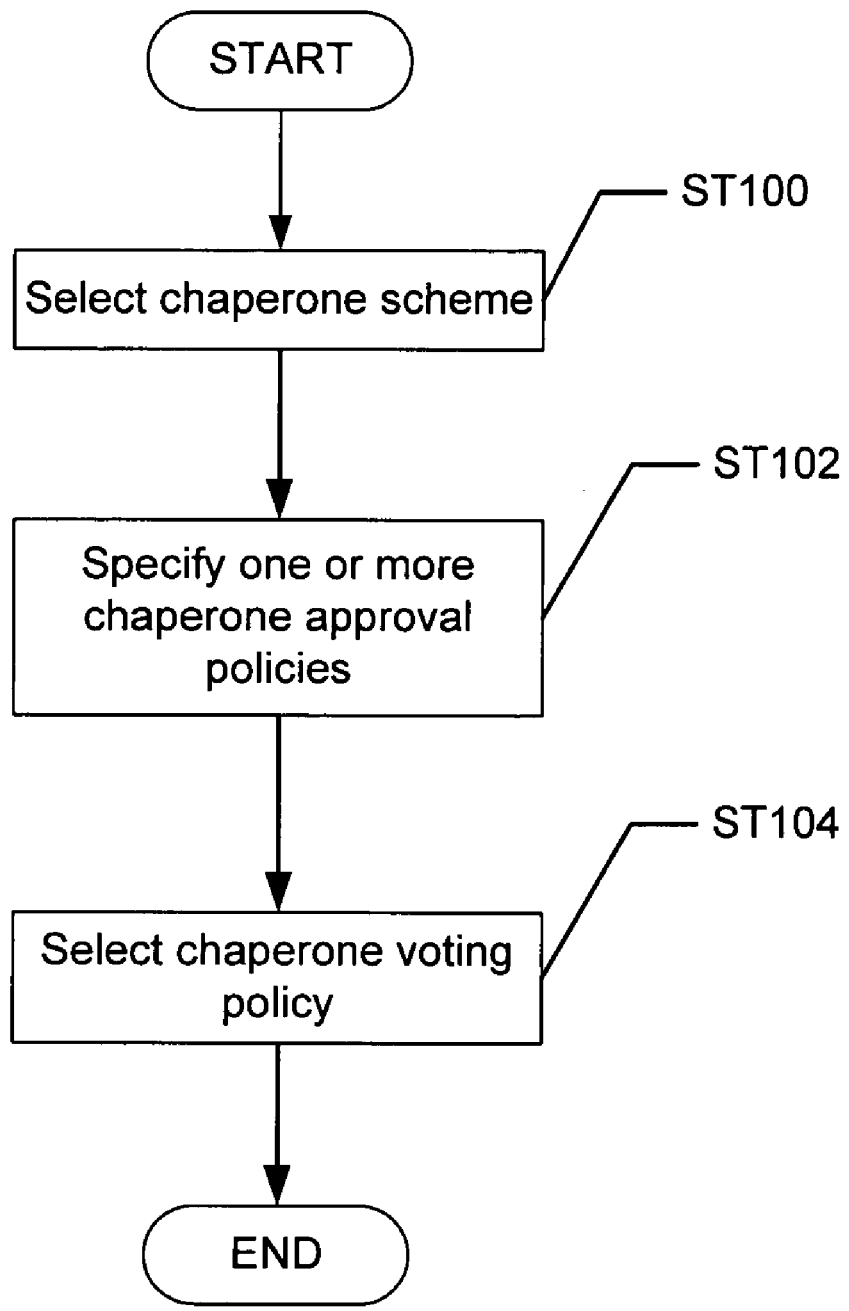
FIG. 1 shows a flowchart in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and system for approving responses generated by an observed node in a distributed system. Further, embodiments of the invention relate to a method and system for approving decision made by the observed node. More specifically, one or more chaperones (i.e., nodes within the distributed system) are designated to observe and/or approve responses and/or decisions generated and made by the observed node prior to forwarding the responses to a target node (i.e., the destination of the response) or implementing the decision. In one or more embodiments of the invention, if the observed node generates a responses (or a decision) which can not be approved because, for example, the response (or decision) is incorrect, inconsistent, or results in the observed node operating outside the specified operating parameters, then the chaperones may refuse to approve the response (or decision).

In one embodiment of the invention, chaperones correspond to nodes in a distributed system that are designated to approve responses generated by one or more observed nodes. Those skilled in the art will appreciate that a node may be both a chaperone and an observed node. Embodiments of the implementation of chaperones in a distributed system are discussed below and shown in FIGS. 2-6.

FIG. 1 shows a flowchart in accordance with one embodiment of the invention. More specifically, FIG. 1 details a method for setting up the distributed system to implement one or more embodiments of the invention. Initially, a chaperone selection scheme is selected (ST100). The chaperone selection scheme corresponds to how the chaperones for a particular observed node are selected. In one embodiment of the invention, the chaperones are selected using a pre-selected node scheme. In the pre-selected node scheme, a certain number of nodes within the distributed system are designated as chaperones for all the nodes (or a subset of nodes) within the distributed system. The actual selection of the chaperones for the system may be performed using any selection scheme/algorithm.

As an alternative, the chaperones for a particular observed node are selected using a per-observed node scheme. In one embodiment of the invention, the per-observed node scheme specifies a function (e.g., a hash function such as SHA-1) which uses a global unique identifier (GUID) of the observed node as input to generate a number of GUIDs (i.e., resulting GUIDs). The resulting GUIDs are used to identify the chaperones associated with the observed node. Said another way, the generated GUIDs correspond to the GUIDs of the nodes which are designated as chaperones of the observed node. Those skilled in the art will appreciate that if node including a particular GUID generated using a function is not present in the distributed system, then a node having the next closest GUID (either less than or greater than the GUID generated) may be designated as a chaperone. In one embodiment of the invention, the function is applied multiple times to the GUID of the observed node to generate the resulting GUIDs.

Figure 2:
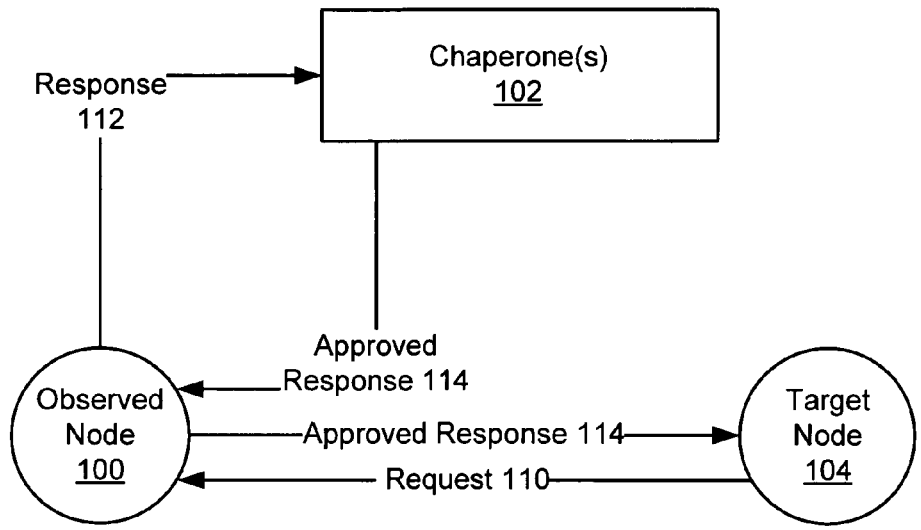
FIGS. 2-4 show chaperone approval policies in accordance with one or more embodiments of the invention.
Figure 3:
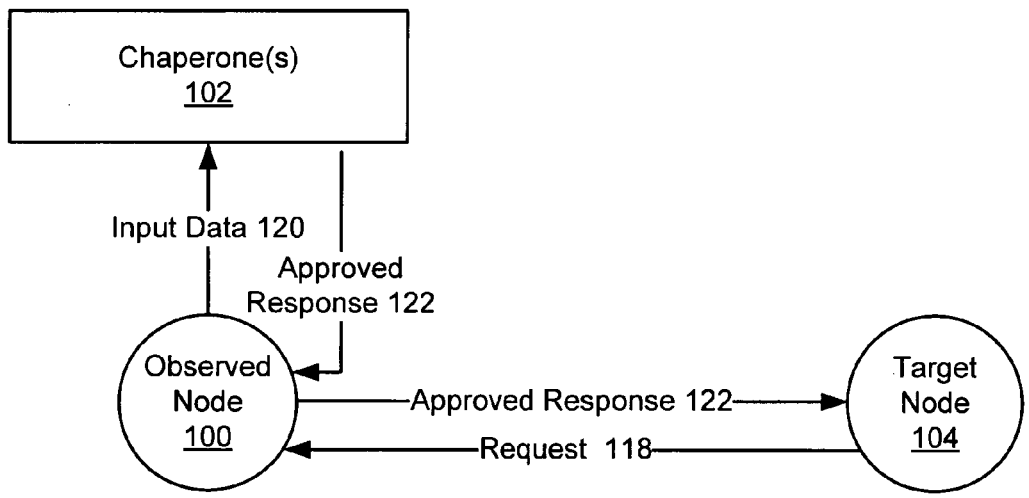
Figure 4:
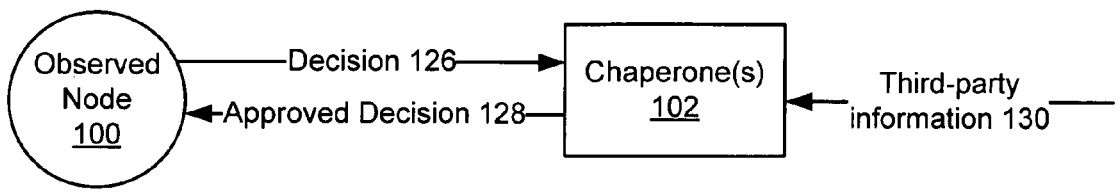

Continuing with FIG. 1, once the chaperone selection scheme has been selected, a chaperone approval policy is specified (ST102). In one embodiment of the invention, the chaperone approval policy specifies the procedure(s) that the chaperones must perform to approve a response generated by the observed node or to approve a decision made by the observed node. Embodiments of chaperone approval policies are shown in FIGS. 2-4 and are discussed below. In one embodiment of the invention, different chaperone approval policies may be used in different scenarios (e.g., for approving different responses and/or decisions). Further, in one embodiment of the invention, multiple chaperone approval polices may be employed by the chaperones for a single observed node.

Continuing with the discussion of FIG. 1, once the chaperone approval policy has been selected, a chaperone voting policy is selected (ST104). In one embodiment of the invention, the chaperone voting policy specifies the minimum number of chaperones which must agree on a value of the response (or agree on the decision) in order for the response to be designated as an approved response (or an approved decision). Further, in one embodiment of the invention, the chaperone voting policy may specify a minimum number of chaperones required to reach a quorum (i.e., the number of chaperones that must participate in the voting) and the percentage of the quorum that must vote in favor of approving the value of the response (or the decision).

Those skilled in the art will appreciate that other policies governing voting by the chaperones may be included in the chaperone voting policy. In one embodiment of the invention, the chaperone voting policy prevents one chaperone from unilaterally approving (or not approving) the value of a response (or approving or not approving a decision made by the observed node). Those skilled in the art will appreciate that the aforementioned steps (i.e., ST100-ST104) may be performed in any order.

FIG. 2 shows a chaperone approval policy in accordance with one embodiment of the invention. As shown in FIG. 2, the chaperone approval policy specifies that in response to receiving a request (110) from a target node (104) (i.e., the node that originally sends the request (110), an observed node (100) first generates a response (112) and then forwards the response (112) to each of the chaperone(s) (102) based on the chaperone selection scheme. The chaperone(s) (102) subsequently approves the response (112) in accordance with a chaperone approval policy and the chaperone voting policy). In one embodiment of the invention, the chaperone(s) (102) may vote on the correct and/or consistent value of the response (112). Once the chaperone(s) has approved the response (112), or more specifically, agreed on the value of the response (112), the chaperone(s) generates an approved response (114). In one embodiment of the invention, the approved response (114) corresponds to a signed response, where the response is signed using authentication material (e.g., encryption key(s), etc.) associated with the chaperone(s).

As an alternative to relying on the observed node (100) to forward the response (112) to each of the chaperone(s) (102), the observed node (100) may only be required to send the response (112) to one of the chaperone(s) (102). That chaperone in turn informs the other chaperone(s) using, for example, a multicast message, that the observed node (102) has generated a response (112). The other chaperone(s) (102) then proceeds to request the response (112) from the observed node (102). Once all the chaperone(s) (102) (or a subset of the chaperone(s) (102) if the implemented chaperone voting policies uses a quorum) have obtained the response (112), then the chaperone(s) (102) may proceed, as discussed above, to generate an approved response (114). Once the approved response (114) has been received by the observed node (100), the observed node (100) may proceed to forward the approved response (114) to the target node (104).

The aforementioned chaperone approval policy does not require the chaperone(s) (102) to perform any calculations with respect to generating the response (112). Rather, the response is generated by the observed node (100) and then approved by the chaperone(s) (102).

FIG. 3 shows a chaperone approval policy in accordance with one embodiment of the invention. As shown in FIG. 3, the chaperone approval policy specifies that in response to receiving a request (118), an observed node (100) forwards input data (120) necessary to generate a response to the request (118) to each of the chaperone(s) (102) using the chaperone selection scheme. Each of the chaperone(s) (102) subsequently use the input data (120) to generate an independent response (not shown). The independent response (not shown) is subsequently approved in accordance with a chaperone voting policy. More specifically, in one embodiment of the invention, the chaperone(s) (102) may vote to determine a correct and/or consistent value of the independent response (not shown) using all the independent response(s) generated by the various chaperone(s) (102). Once the chaperone(s) (102) have approved the response (not shown), or more specifically, agreed on the value of the independent response, the chaperone(s) (102) generate an approved response (122). In one embodiment of the invention, the approved response (122) corresponds to a signed response, where the response is signed using authentication material (e.g., encryption key(s), etc.) associated with the chaperone(s).

As an alternative to relying on the observed node (100) to forward the input data (120) to each of the chaperone(s) (102), the observed node (100) need only forward the input data (120) to one of the chaperone(s) (102). That chaperone (102) in turn informs the other chaperone(s) using, for example, a multicast message, that the observed node (102) has received a request (118). The other chaperone(s) (102) then proceeds to request the input data (120) from the observed node (102). Once all the chaperone(s) (102) (or a subset of the chaperone(s) (102) if the implemented chaperone voting policy uses a quorum) have received all the input data, then the chaperone(s) (102) may proceed, as discussed above, to generate a approved response (122). Once the approved response (122) has been received by the observed node (100), the observed node (100) may proceed to forward the approved response (122) to a target node (104).

In contrast to the chaperone approval policy shown in FIG. 2, the chaperone approval policy shown in FIG. 3 does not require the observed node (100) to generate the response (112), rather the chaperone(s) (102) includes the necessary functionality to perform calculations required to generate and approve a response.

FIG. 4 shows a chaperone approval policy in accordance with one embodiment of the invention. In contrast to the chaperone approval policies shown in FIGS. 2 and 3 and described above, the chaperone approval policy shown in FIG. 4 addresses the scenario where the observed node (100) is requesting the chaperone(s) (102) to approve a decision (126) made by the observed node (100). For example, the observed node (100) may have changed its configuration and has requested that the chaperone(s) (102) approve the new configuration prior to the observed node (100) implementing the new configuration.

In the above scenario, the chaperone approval policy may specify that the observed node (100) forward information (e.g., the new configuration file) about the decision to the chaperone(s) (102). The chaperone(s) (102) may subsequently determine whether the decision falls within the allowed operating parameters of the observed node (100). The allowed operating parameters for the observed node (100) may be determined by the chaperone(s) (102) using information about the role of the observed node (100) within the distributed system, the effect of the decision on the operation of the observed node (100), etc.

Alternatively, the chaperone(s) (102) may also obtain information about the allowed operating parameters of the observed node (100) from third-party information (130) (i.e., information obtained from a node in the distributed system other than the observed node (100) and the nodes designated as chaperone(s) (102) of the observed node (100)). If the chaperone(s) (102) approves the decision of the observed node (102), then the chaperone(s) (102) sends an approved decision (128) to the observed node (100). Upon receiving the approved decision (128), the observed node (100) may proceed to implement the decision. In one embodiment of the invention, the approved decision (128) may correspond to a signed certificate.

Thus, continuing with the example above, if the new configuration file alters the operation of the observed node (100) such that it can no longer perform functions required by the distributed system (or other nodes within the distributed system), then the chaperone(s) (102) does not approve the new configuration. However, if the new configuration is within the allowed operating parameters of the observed node (100) (as determined by the chaperone(s) (102)), then the chaperone(s) (102) approves the new configuration by issuing an approved decision. The observed node (100), upon receiving the approved decision (128) from the chaperone(s) (102), may proceed to implement the new configuration.

Those skilled in the art will appreciate that while three different chaperone approval policies have been described, the invention may be implemented using any possible chaperone approval policy.

Figure 5:
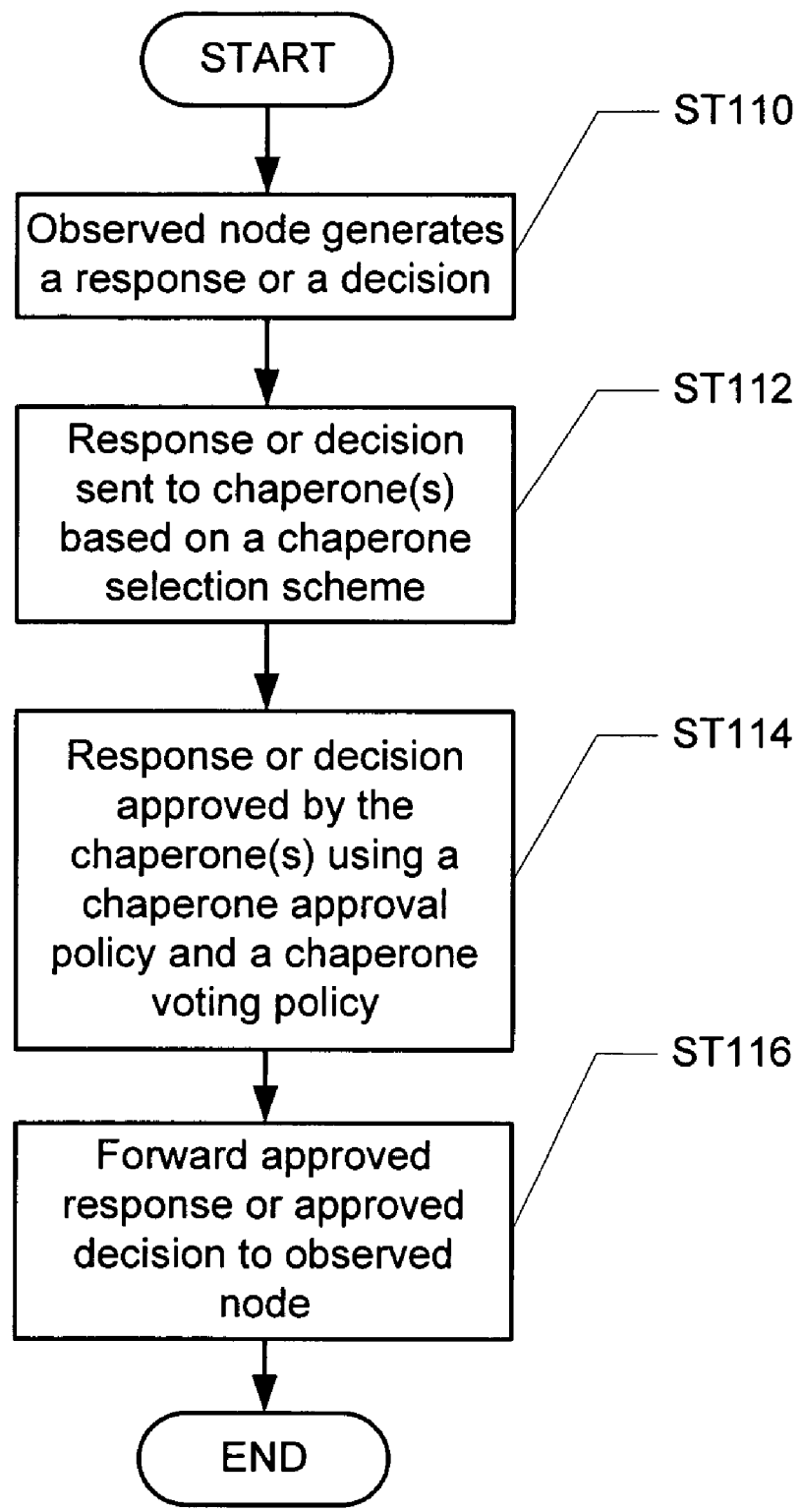
FIG. 5 shows a flowchart in accordance with one embodiment of the invention.

FIG. 5 shows a flowchart of a method for implementing one or more embodiments of the invention. At this stage the distributed system includes the necessary information (e.g., chaperone voting policy, chaperone selection scheme, chaperone approval policies, etc.) to implement one or more embodiments of the invention. Initially, an observed node generates a response (in response to a request from a target node) or a decision (as discussed above) (ST110). The observed node subsequently sends the response or the decision to one or more chaperone(s) based on a chaperone selection scheme (discussed above) (ST112). The chaperone(s) subsequently approve the response or the decision using a chaperone approval policy (discussed above) and a chaperone voting policy (discussed above) (ST114). Once the chaperone(s) have approved the response or decision, the approved response or decision is sent to the observed node (ST116).

In one embodiment of the invention, the invention is implemented such that the chaperone(s) does not respond to the observed node if the response or decision is not approved. Accordingly, in such an embodiment, the observed node only waits for a pre-determine period of time prior to re-submitting the request or decision to the chaperone(s) or generating and re-submitting a new response or a new decision to the chaperone(s).

As discussed above, in one or more embodiments of the invention, the chaperone(s) may sign the approved response or approved decision using authentication material. In one embodiment of the invention, the authentication material corresponds to an authentication key. In another embodiment of the invention, chaperones associated with a particular observed node each include a portion of an authentication key. Once the chaperone(s) have approved the response or decision, then a minimum number of chaperone(s) must use their portion of the authentication key to reconstruct the encryption key. The reconstructed encryption key is subsequently used to sign the approved response or approved decision.

As discussed above, chaperone(s) for a given node may be pre-selected (e.g., using the pre-selected node scheme) or may be determined using the GUID of the observed node and a mathematical function (or algorithm) (e.g., the per-observed node scheme). In one embodiment of the invention, under the pre-selected node scheme, each of the chaperone(s) may include a list of the other chaperones (e.g., a list of the GUIDs of the other chaperone(s)). Alternatively, in one embodiment of the invention, under the pre-observed node scheme, a node which is designated as a chaperone for a particular observed node, may locate and subsequently communicate with other chaperones of the observed node using knowledge of the observed nodes GUID and information about the algorithm used to select the chaperones. Knowledge of the other chaperone(s) enable the observed nodes to locate and communicate with one another in the distributed system using the overlay network, or directly via the underlying network infrastructure (e.g., TCP/IP).

Those skilled in the art will appreciate that the chaperone(s) associated with a given observed node does not need to be physically connected to the observed node. Rather, the chaperone(s) for a given observed node may be located anywhere in the distributed system. Moreover, in one embodiment of the invention, if the observed node is associated with more than one chaperone, then the chaperones associated with the observed node may establish a separate communications channel amongst themselves, such that the observed node may not interfere with the operation(s) of the chaperones (e.g., voting on an agreed result, etc.).

Those skilled in the art will appreciate that a single distributed system may simultaneously implement different chaperone selection schemes. Further, those skilled in the art will appreciate that, in one or more embodiments of the invention, at least the observed nodes within the distributed system include functionality to locate at least one of the chaperone(s) associated with the observed node.

In one embodiment of the invention, if a node which was previously not a chaperone is subsequently designated as a chaperone for a particular observed node (or set of observed nodes), then the chaperone(s) already associated the observed node are informed that about the new chaperone. Further, in one embodiment of the invention, the chaperone(s) already associated with the observed node may forward information (e.g., chaperone approval scheme, chaperone selection scheme, chaperone voting policy, authentication keys, etc.) about the operation of the chaperone(s) currently associated with the particular observed node (or set of observed nodes).

As discussed above, various chaperone approval policies may require that the observed node wait for an approved response (or approved decision) prior to forwarding a response to a target node (or implementing a decision). In one embodiment of the invention, the observed node may forward a response to target node (or implement a decision) without waiting for the chaperone(s) to respond. In such embodiments, the chaperone(s) may eventually provide an approved response (or approved decision) to the observed node. The observed node then stores the approved response (or approved decision). The observed node may then use the stored approved response (or approved decision) as proof that the response or decision is valid.

As discussed above, chaperone(s) may be used to approve responses and decisions. In one embodiment of the invention, the chaperone(s) may also be used to provide reputation information to third-parties. For example, the chaperone(s) for a given observed node may track certain statistics associated with the observed node, for example, the chaperone(s) may track the number of packets dropped, availability of the observed node, percentage of time the observed node is offline, etc. The chaperone(s) may then publish that they are chaperone(s) for the observed node. At some later time, a node interested in using the observed node may inquire about the observed nodes reputation (i.e., how the node operates). The chaperone(s) may generate a signed message detailing the observed node's reputation, where the observed node's reputation is obtained from the statistics tracked by the chaperone(s).

In one embodiment of the invention, nodes, other than the chaperone(s) and the observed node, may locate the chaperone(s) associated with a given observed node using one of the following mechanisms. In one embodiment of the invention, the chaperone(s) publish that they are chaperone(s) for a given observed node (or set of observed nodes). Alternatively, the observed node may publish the GUID(s) of the chaperone(s) associated with the observed node. Alternatively, nodes, other than the chaperone(s) or the observed node, may include functionality to determine the chaperone(s) associated with a given node using, for example, the GUID of the observed node or a list of GUIDs of the associated chaperones. Those skilled in the art will appreciate that other mechanisms may be used to located chaperone(s) associated with the observed node.

Figure 6:
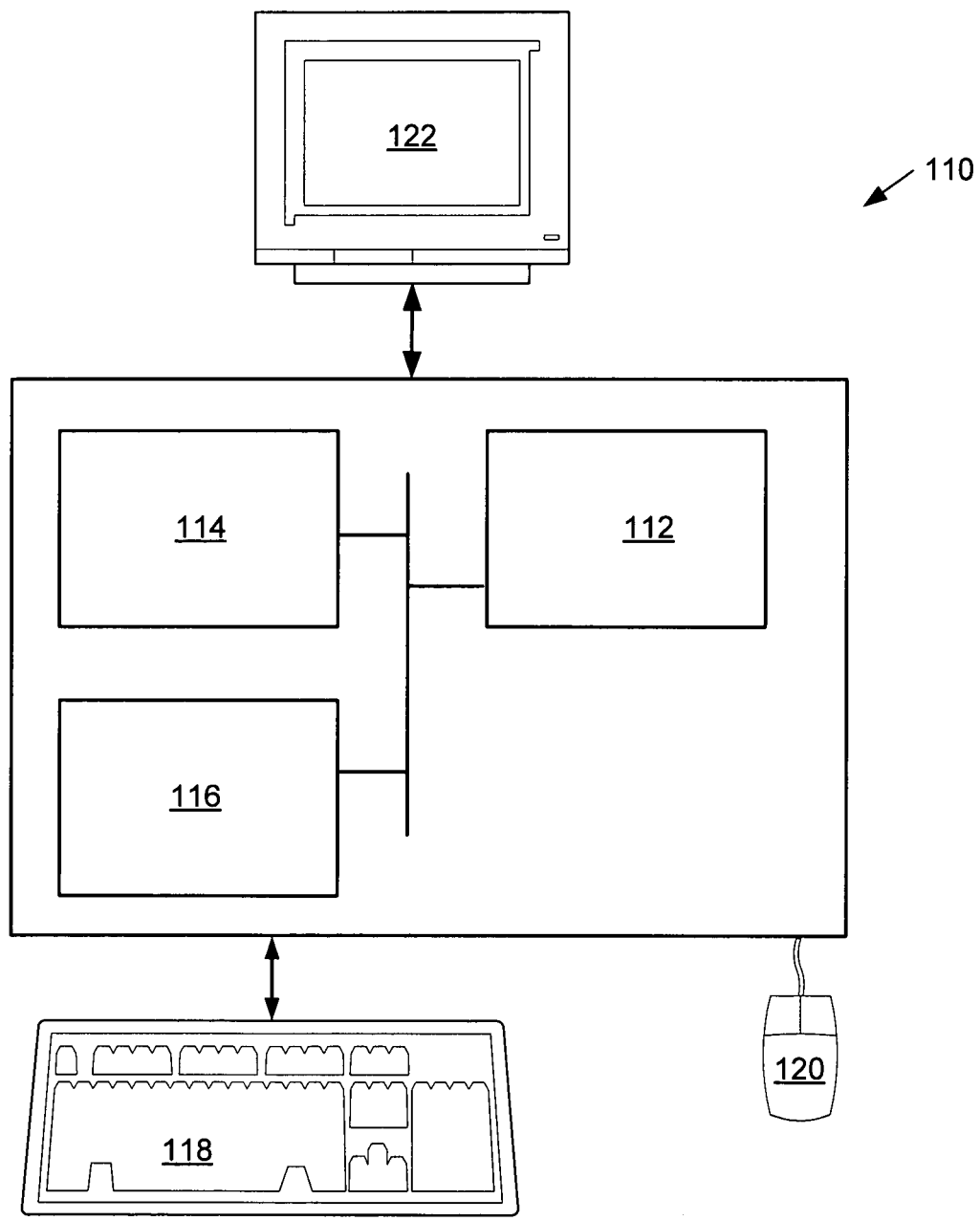
FIG. 6 shows a computer system in accordance with one embodiment of the invention.

An embodiment of the invention may be implemented on virtually any type of computer regardless of the platform being used. For example, as shown in FIG. 6, a networked computer system (110) includes a processor (112), associated memory (114), a storage device (116), and numerous other elements and functionalities typical of today's computers (not shown). The networked computer (110) may also include input means, such as a keyboard (118) and a mouse (120), and output means, such as a monitor (122). The networked computer system (110) is connected to a local area network (LAN) or a wide area network via a network interface connection (not shown). Those skilled in the art will appreciate that these input and output means may take other forms. Further, those skilled in the art will appreciate that one or more elements of the aforementioned computer (110) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for approving a response or a decision of an observed node in a distributed system, comprising:
   generating the response to a request from a target node by the observed node;
   forwarding the response from the observed node to at least one of a plurality of chaperone nodes associated with the observed node based on a chaperone scheme, wherein the chaperone scheme comprises a per-observed node scheme; and
   approving the response by the plurality of chaperone nodes using a chaperone voting policy and a chaperone approval policy to obtain an approved response,
   forwarding the approved response to the target node;
   wherein the distributed system implements an overlay network for message delivery,
   wherein the observed node and the plurality of chaperone nodes communicate using the overlay network, and
   wherein the per-observed node scheme comprises selecting the at least one of the plurality of chaperone nodes associated with the observed node using a global unique identifier (GUID) assigned to the observed node.

2. The method of claim 1, wherein the approved response is forwarded to the target node by at least one of the plurality of chaperone nodes.

3. The method of claim 1, wherein the at least one of the plurality of chaperone nodes associated with the observed node are determined by applying a hash function to the GUID a plurality of times to obtain a plurality of GUIDs, wherein each of the plurality of GUIDs is associated with one of the plurality of chaperone nodes.

4. The method of claim 1, wherein functionality necessary to implement at least one selected from the group consisting of the chaperone voting policy, the chaperone approval policy, and the chaperone selection policy is loaded onto all nodes in the distributed system.

5. The method of claim 1, wherein each of the plurality of chaperone nodes comprises at least one selected from the group consisting of knowledge of at least one other of the plurality of chaperone nodes and functionality to locate at least one other of the plurality of chaperone nodes.

6. The method of claim 1, wherein each of the plurality of chaperone nodes comprises authentication material, wherein the authentication material is used to generate the approved response.

7. The method of claim 1, wherein the chaperone approval scheme specifies:
generating an independent response by each of the plurality of chaperone nodes;
agreeing on a value for the independent response using the plurality of independent responses and the chaperone voting policy to obtain an agreed value; and
providing the approved response to the observed node, wherein the approved response comprises the agreed value.

8. The method of claim 7, wherein the independent response is generated by requesting the observed node to provide information necessary to generate the independent response.

9. The method of claim 1, wherein the chaperone approval scheme specifies:
requesting the response from the observed node by each of the plurality of chaperone nodes to obtain a plurality of responses;
agreeing on a value for the response using the plurality of responses and the chaperone voting policy to obtain an agreed value; and
providing the approved response to the observed node, wherein the approved response comprises the agreed value.

10. The method of claim 1, wherein the chaperone approval scheme specifies:
requesting the decision from the observed node by each of the plurality of chaperone nodes to obtain a plurality of decision;
determining whether the decision is within an allowed operating parameter using information about the allowed operating parameter of the observed node and the chaperone voting policy; and
providing an approved decision to the observed node, if the plurality of chaperone nodes determine that the decision is within the allowed operating parameters.

11. The method of claim 1, wherein the chaperone voting policy specifies a minimum number of the plurality of chaperone nodes that must agree on a value of the response prior to approving the response.

12. The method of claim 1, wherein the overlay network uses at least one distributed hash table.

13. A distributed system, comprising:
an observed node generate a response to a request from a target node; and
a plurality of chaperone nodes, wherein each of the plurality of chaperone nodes is configured to:
provide a signed response to the observed node in response to a request from the observed node, and
approve the response provided by the observed node, wherein the approved response is forwarded to the target node;
wherein the distributed system implements an overlay network for message delivery,
wherein the observed node and the plurality of chaperone nodes communicate using the overlay network,
wherein the plurality of chaperone nodes are selected using a per-observed node scheme, and
wherein the per-observed node scheme comprises selecting the at least one of the plurality of chaperone nodes associated with the observed node using a global unique identifier (GUID) assigned to the observed node.

14. The distributed system of claim 13, wherein the response and the decision are approved by the plurality of chaperone nodes using a chaperone voting policy and a chaperone approval policy.

15. The distributed system of claim 14, wherein the chaperone voting policy specifies a minimum number of the plurality of chaperone nodes that must agree on a value of the response prior to approving the response.

16. The distributed system of claim 14, wherein the chaperone approval policy specifies:
generating an independent response by each of the plurality of chaperone nodes;
agreeing on a value for the independent response using the plurality of independent responses and the chaperone voting policy to obtain an agreed value; and
providing the approved response to the observed node, wherein the approved response comprises the agreed value, wherein the independent response is generated by requesting the observed node to provide information necessary to generate the independent response.

17. The distributed system of claim 14, wherein the chaperone approval scheme specifies:
requesting the response from the observed node by each of the plurality of chaperone nodes to obtain a plurality of responses;
agreeing on a value for the response using the plurality of responses and the chaperone voting policy to obtain an agreed value; and
providing the approved response to the observed node, wherein the approved response comprises the agreed value.

18. The distributed system of claim 14, wherein the chaperone approval scheme specifies:
requesting the decision from the observed node by each of the plurality of chaperone nodes to obtain a plurality of decision;
determining whether the decision is within an allowed operating parameter using information about the allowed operating parameter of the observed node and the chaperone voting policy; and
providing an approved decision to the observed node, if the chaperones determine that the decision is within the allowed operating parameters.

19. The distributed system of claim 13, wherein the at least one of the plurality of nodes associated with the observed node are determined by applying a hashing function to the GUID a plurality of time to obtain a plurality of GUIDs, wherein each of the plurality of GUIDs is associated with one of the plurality of chaperone nodes.

20. The distributed system of claim 13, wherein each of the plurality of chaperone nodes comprises at least one selected from the group consisting of knowledge of at least one other of the plurality of chaperone nodes and functionality to locate at least one other of the plurality of chaperone nodes.

21. The distributed system of claim 13, wherein each of the plurality of chaperone nodes comprises authentication material, and wherein the authentication material is used in generating the approved response.

22. A computer readable medium comprising software instructions for approving a response or a decision of an observed node in a distributed system, comprising software instructions to:

generate the response to a request from a target node by the observed node;

forward the response from the observed node to at least one of a plurality of chaperone nodes associated with the observed node based on a chaperone scheme, wherein the chaperone scheme comprises a per-observed node scheme; and approve the response by the plurality of chaperone nodes using a chaperone voting policy and a chaperone approval policy to obtain an approved response, wherein the distributed system implements an overlay network for message delivery, wherein the observed node and the plurality of chaperone nodes communicate using the overlay network, and wherein the per-observed node scheme comprises selecting the at least one of the plurality of chaperone nodes associated with the observed node using a global unique identifier (GUID) assigned to the observed node.

* * * * *